(12) United States Patent
Borisov

(10) Patent No.: US 8,271,777 B2
(45) Date of Patent: Sep. 18, 2012

(54) SECURE HOST CONNECTION

(75) Inventor: Boris Borisov, Brampton (CA)

(73) Assignee: Psion Teklogix Inc., Mississauga (CA)

( * ) Notice: Subject to any disclaimer, the term of this patent is extended or adjusted under 35 U.S.C. 154(b) by 586 days.

(21) Appl. No.: 12/205,242

(22) Filed: Sep. 5, 2008

(65) Prior Publication Data

US 2010/0064130 A1 Mar. 11, 2010

(51) Int. Cl.
*H04L 9/00* (2006.01)
(52) U.S. Cl. .......................... 713/153; 709/227; 726/14
(58) Field of Classification Search ............... 726/3, 14; 709/227; 713/153
See application file for complete search history.

(56) References Cited

U.S. PATENT DOCUMENTS

| | | | | |
|---|---|---|---|---|
| 6,092,191 A * | 7/2000 | Shimbo et al. | 713/153 |
| 6,185,680 B1 * | 2/2001 | Shimbo et al. | 713/160 |
| 6,311,215 B1 * | 10/2001 | Bakshi et al. | 709/221 |
| 6,609,198 B1 * | 8/2003 | Wood et al. | 713/155 |
| 7,028,183 B2 * | 4/2006 | Simon et al. | 713/168 |
| 7,100,195 B1 * | 8/2006 | Underwood | 726/2 |
| 7,197,547 B1 * | 3/2007 | Miller et al. | 709/223 |
| 7,430,755 B1 * | 9/2008 | Hughes et al. | 726/3 |
| 7,543,069 B2 * | 6/2009 | Hasti et al. | 709/228 |
| 7,818,781 B2 * | 10/2010 | Golan et al. | 726/1 |
| 7,853,781 B2 * | 12/2010 | Freed et al. | 713/151 |
| 2004/0044771 A1 * | 3/2004 | Allred et al. | 709/227 |
| 2005/0160161 A1 * | 7/2005 | Barrett et al. | 709/223 |

* cited by examiner

Primary Examiner — Jung Kim
Assistant Examiner — Thomas Ho
(74) Attorney, Agent, or Firm — Pearne & Gordon LLP

(57) ABSTRACT

The present patent disclosure describes a system and method for maintaining persistent secure connections between a terminal and a host. The system comprises a session manager component for storing session information associated with a terminal identifier (ID) of the terminal, the session information comprising a client connection ID for identifying a persistent secure client connection and a terminal connection ID for identifying a secure terminal connection. The system also comprises a connection manager component for establishing communication between the persistent secure client connection, identified by the client connection ID, and the secure terminal connection, identified by the terminal connection ID. The method comprises the step of storing session information associated with a terminal identifier (ID) of the terminal, the session information comprising a client connection ID for identifying a persistent secure client connection and a terminal connection ID for identifying a secure terminal connection. The method further comprises the step of establishing communication between the persistent secure client connection, identified by the client connection ID, and the secure terminal connection, identified by the terminal connection ID.

20 Claims, 6 Drawing Sheets

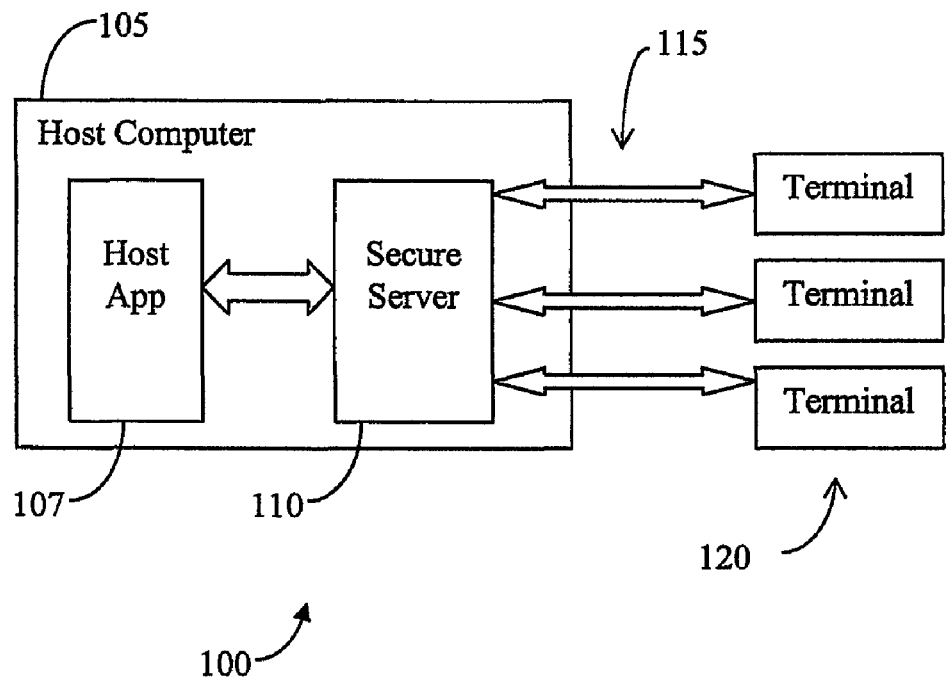
Figure 1 – Prior Art
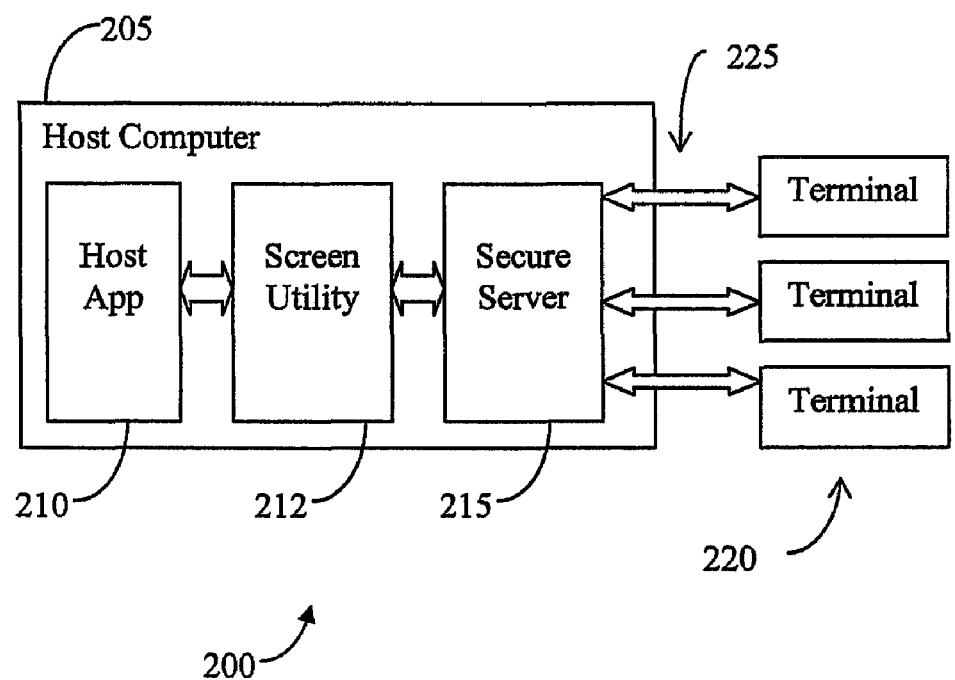
Figure 2 – Prior Art

SECURE HOST CONNECTION

FIELD OF INVENTION

The present disclosure relates generally to host-terminal communication, and more particularly to providing secure communication between a host and terminal.

BACKGROUND OF THE INVENTION

The host-terminal communication model is used in many areas. The host runs applications and may communicate with the terminal using messages. The messages may comprise screens that display the results of the application run on the host, as well as providing an input means for inputting information to the host application. A connection may comprise state information that indicates the connection and application state associated with the connection.

FIG. 1 depicts in a block diagram a prior art environment 100 for providing secure connections between a host and a terminal. The prior art environment 100 comprises a host computer 105. The host computer 105 has an application 107 that communicates with a secure server 110. The secure server 110 provides for non-persistent secure connections 115 between the secure server 110 and the wireless terminal 120, and between the secure server 110 and the application 107. The secure connection 115 with the wireless terminal 120 may time-out quickly due to the secure server protocol. If a wireless terminal 120 is out of communication temporarily the connection with the secure server 110 must be re-established. However, once the connection is lost, the screen and state information of the connection associated with the application is lost. As a result, if the wireless terminal 120 temporarily loses connection with the secure server 110, the terminal 120 must re-establish the state of the connection upon re-connection. As a result the secure communication between the host 105 and terminal 120 is not persistent.

FIG. 2 shows a further prior art environment 200 for maintaining persistent secure communication between a host and a terminal. The environment 200 comprises a host computer 205. The host computer has an application 210 that communicates with a terminal 220. A secure server 215 provides a non-persistent secure communication channel 225 between the host computer 205 and the terminal 220. The secure server 215 communicates with the application 210 through an interactive Screen utility 212. The interactive Screen utility 212 is a program that allows a terminal 220 to establish a connection to an application 205 though the secure server 215. The terminal 220 may disconnect connect and re-connect to the interactive Screen utility 212 which maintains the connection to the application.

There exists ways to provide secure communication between an application and a wireless terminal. Existing solutions may provide persistent secure communication between a host and a terminal, however the existing solutions may not provide for secure persistent communication for generic applications. Furthermore, existing solutions do not allow multiple independent secure connections to be established between an application and terminals.

SUMMARY OF THE INVENTION

It is an object of the invention to provide improved secure communication between a host and a terminal.

In accordance with one aspect of the present invention there is provided a system for maintaining a persistent secure connection between a host and a terminal. The system comprises a session manager component for storing session information associated with a terminal identifier (ID) of the terminal, the session information comprising a client connection ID for identifying a persistent secure client connection and a terminal connection ID for identifying a secure terminal connection. The system also comprises a connection manager component for establishing communication between the persistent secure client connection, identified by the client connection ID, and the secure terminal connection, identified by the terminal connection ID.

In accordance with another aspect of the present invention there is provided a method for maintaining a persistent secure connection between a host and a terminal. The method comprises the step of storing session information associated with a terminal identifier (ID) of the terminal, the session information comprising a client connection ID for identifying a persistent secure client connection and a terminal connection ID for identifying a secure terminal connection. The method further comprises the step of establishing communication between the persistent secure client connection, identified by the client connection ID, and the secure terminal connection, identified by the terminal connection ID.

In accordance with yet another aspect of the present invention there is provided a computer-readable medium storing instructions or statements for use in the execution in a computer of a method for maintaining a persistent secure connection between a host and a terminal. The method comprises the step of storing session information associated with a terminal identifier (ID) of the terminal, the session information comprising a client connection ID for identifying a persistent secure client connection and a terminal connection ID for identifying a secure terminal connection. The method further comprises the step of establishing communication between the persistent secure client connection, identified by the client connection ID, and the secure terminal connection, identified by the terminal connection ID.

In accordance with yet another aspect of the present invention there is provided a propagated signal carrier carrying signals containing computer-executable instructions that can be read and executed by a computer, the computer-executable instructions being used to execute a method for maintaining a persistent secure connection between a host and a terminal. The method comprises the step of storing session information associated with a terminal identifier (ID) of the terminal, the session information comprising a client connection ID for identifying a persistent secure client connection and a terminal connection ID for identifying a secure terminal connection. The method further comprises the step of establishing communication between the persistent secure client connection, identified by the client connection ID, and the secure terminal connection, identified by the terminal connection ID.

BRIEF DESCRIPTION OF THE DRAWINGS

These and other features of the invention will become more apparent from the following description in which reference is made to the appended drawings wherein:

FIG. 1 depicts in a block diagram, a prior art environment for providing secure connections between a host and a terminal;

FIG. 2 depicts in a block diagram, a prior art environment for maintaining persistent secure communication between a host and terminal;

DETAILED DESCRIPTION

A system and method of the present patent disclosure will now be described with reference to various examples of how the embodiments can best be made and used. The system and method described herein describe a client session manager for providing and maintaining persistent secure client sessions to applications. The client session manager described herein may preserve and restore the state of a secure connection.

Figure 3:
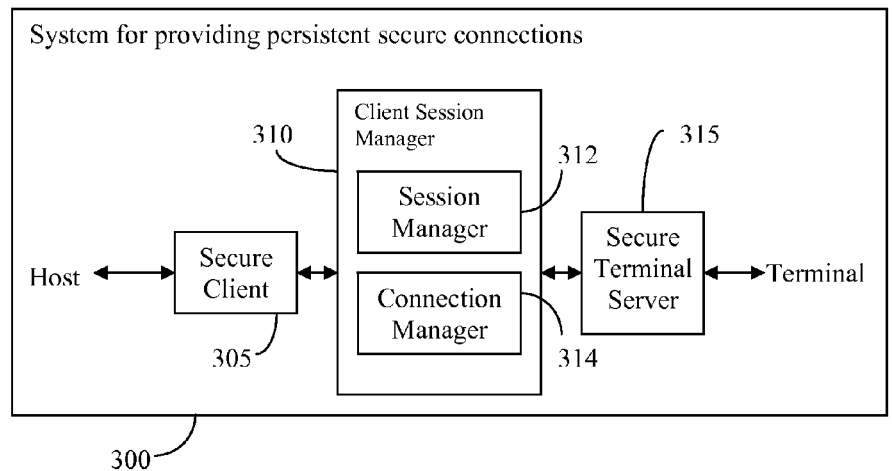
FIG. 3 depicts in a block diagram, illustrative components of an exemplary embodiment of a system for maintaining persistent secure connections between a host and terminal.

FIG. 3 depicts in a block diagram, illustrative components of an embodiment of a system 300 for maintaining persistent secure connections between a host and terminal. The system 300 for maintaining persistent secure connections comprises a secure client 305, a client session manager 310, and a secure terminal server 315.

The secure client 305 establishes a secure connection with a host. The secure client 305 may communicate with the host using, for example a secure shell (SSH) protocol. A host application (not shown) may communicate with the secure client 305 through a secure host server (not shown). The secure host server and the secure client 305 encrypt and decrypt messages sent between the system 300 for providing secure persistent connections and the host application. The secure client 305 ensures that the secure connection remains active. This may be accomplished by sending the secure host server periodic messages, such as a keep-alive packet. A secure client 305 may be established for each secure connection made to the host application by terminals. Each secure connection established by a secure client 305 may be identified by a client connection identifier (ID). The secure client 305 decrypts messages received from the host application, sent through the secure host server, and passes the decrypted message to the client session manager 310. The secure client 305 may also receive a message from the client session manager 310, encrypt the message and send it to the host application through the secure host server (which decrypts the message). The secure client 305, in coordination with the secure host server, may also provide the required functionality for creating maintaining, and destroying a secure connection, such as for example an SSH connection (as is known in the art).

The secure terminal server 315 establishes a secure connection to a terminal (not shown). The secure terminal server 315 may receive connection requests from multiple terminals, and establish a unique secure connection to each terminal. The secure terminal server 315 encrypts and decrypts messages it sends and receives to each terminal. The messages the secure terminal server 315 sends to and receives from the terminal are received by and sent to the client session manager 310. Each connection to a terminal may be uniquely identified by a terminal connection identifier. A connection to a terminal may include a terminal identifier that uniquely identifies the terminal making the connection request. Once the secure terminal server 315 establishes a secure connection to a terminal, the secure terminal server 315 sends the terminal connection identifier and the terminal identifier to the client session manager 310.

The client session manager 310 comprises a session manager 312 and a connection manager 314. The client session manager 310 receives a new secure connection from the secure terminal server 315 and determines if the terminal has already established a connection to the client session manager 310. The session manager 312, of the client session manager 310, receives the new connection and if it determines that the terminal does not have an existing session it creates a new session, and assigns a session identifier to the received connection. Creating a new session may require a new secure client 305 to be created. The new secure client 305 establishes a persistent secure connection to the host. The new secure client may be associated with a unique client connection ID. If a session already exists, the session manager 312 determines the session identifier associated with the terminal. The session manager 312 sends the terminal connection identifier and a client connection identifier to the connection manager 314. The connection manager 314 receives the terminal connection identifier and the client connection identifier and establishes communication between the client connection and the terminal connection. The connection manager 314 passes messages between the client connection and the terminal connection.

The client session manager 310 stores session information for each established session. When a new terminal connection is established from a terminal with an existing session, the client session manager 310 restores the connection state of the session. As a result, a terminal may re-establish a secure connection to the same state it was in at the time of disconnection. This allows a terminal to be disconnected from the secure terminal server 315 without losing the state information. Once the client session manager 310 re-establishes the session state with the terminal over the new terminal connection, any messages received from the terminal connection may be passed to the appropriate secure client 305 associated with the session, through the client connection ID, which then encrypts the message and sends it to the secure host server. Similarly, any messages received from the client connection are passed to the appropriate terminal connection associated with the session. Through the use of the client session manager 310, persistent secure connections may be established between a host application and multiple terminals.

Figure 4:
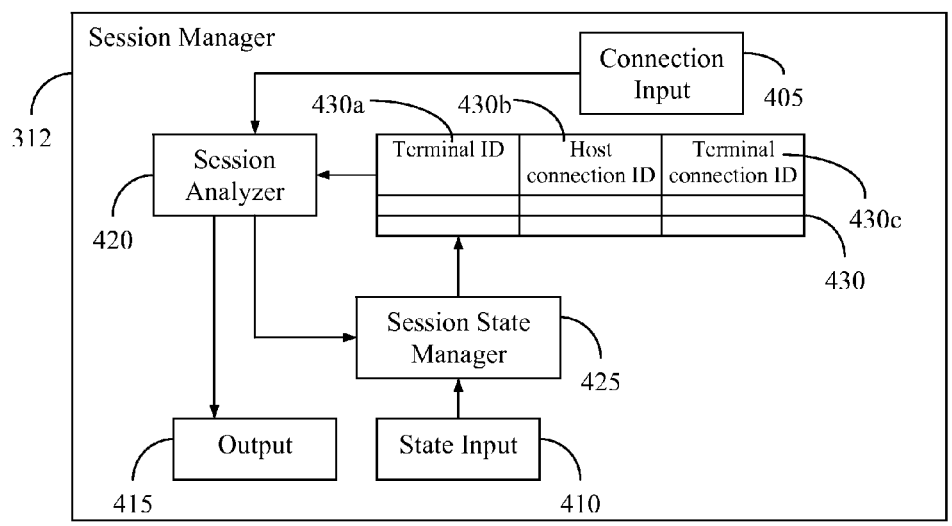
FIG. 4 depicts in a block diagram, illustrative components of an exemplary embodiment of a session manager in accordance with the system for maintaining persistent secure connections between a host and a terminal.

FIG. 4 depicts in a block diagram, illustrative components of an embodiment of a session manager 312 (see FIG. 3) in accordance with the system for maintaining persistent secure connections between a host and a terminal. The session manager 312 comprises a connection input component 405 for receiving new terminal connections, including a terminal connection ID and a terminal ID, from the secure terminal server 315. The session manager 312 also comprises a session state input component 410 for receiving session state information from the connection manager 314. The session manager 312 further comprises an output component 415 for sending terminal connection identifiers, client connection identifiers and session state information to the connection manager 314. The session manager further comprises a session analyzer 420, a session state manager 425 and a session state table 430.

The session state table 430 may store session information including the state of a session. The session state table 430 may store information as table entries, each entry including, for example:

Session ID: an identifier for uniquely identifying active sessions;

Terminal ID 430a: an identifier for uniquely identifying the terminal associated with the session;

Host connection ID 430b: an identifier for uniquely identifying the persistent secure client associated with the session;

Terminal connection ID 430c: an identifier for uniquely identifying the active secure connection to the terminal associated with the session;

Session state: state information for the current state of the session; and

Active: a flag for indicating whether the session is active or not.

The session analyzer 420 receives the new terminal connections from the connection input component 405. The session analyzer 420 determines if the terminal that has established the new connection is associated with an active session by looking up the terminal ID of the new connection in the session state table 430. If the terminal ID is located in the session state table 430, then there is an active session associated with the terminal. Alternatively, if the session state table 430 stores an active flag, it may be checked to determine if the session is active. The session analyzer 420 passes the new terminal connection ID (and terminal ID or session ID) associated with the new terminal connection to the session state manager 425, which stores the new terminal connection ID in the appropriate entry of the session state table 430. The session analyzer 420 also retrieves the client connection ID from the session state table 430 and passes the client connection ID and the terminal connection ID to the output component 415 which passes the information to the connection manager 314. Additionally, since there is an existing session, the session analyzer 420 also sends the session state information to the output component 415 which passes the information to the connection manager 314, which will re-establish the state of the session. If the session analyzer 420 does not find the terminal ID in the session state table 430 (or the active flag is present but not set), then there is no active session associated with the terminal that has established the new terminal connection. The session analyzer 420 creates a new secure client 305 (and associated client connection ID) for the session and creates a new session ID for the session. The session analyzer 420 then sends the new session information, including the terminal connection ID, the terminal ID, the session ID and the client connection ID to the session state information manager 425, which stores the information as a new entry in the session state table 430. The session analyzer 420 then sends the client connection ID and the terminal connection ID to the output component 415 which passes the information to the connection manager 314 which establishes communication between the client connection and terminal connection.

The session state manager 425 may receive information to be updated or added to the session state table 430 from the session analyzer 420 as set forth above. Additionally, the session state manager 425 may receive information to be updated in the session state table 430 from the session state input component 410. The information received from the session state input component 410 may comprise the state information for the various sessions to be updated. The state information allows the session to be re-established.

Figure 5:
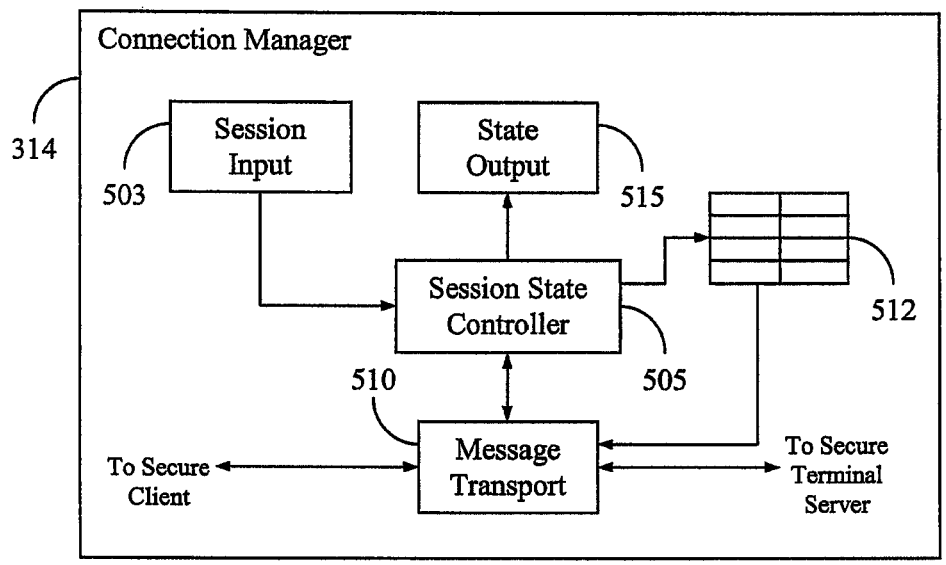
FIG. 5 depicts in a block diagram, illustrative components of an exemplary embodiment of a session manager in accordance with the system for maintaining persistent secure connections between a host and a terminal.

FIG. 5 depicts in a block diagram, illustrative components of an embodiment of a connection manager 314 in accordance with an exemplary embodiment of the system for maintaining persistent secure connections between a host and a terminal. The connection manager 314 comprises a session information input component 503 for receiving session information, including client connection IDs, terminal connection IDs, and session state information. The session information input component 503 passes the session state information to the session controller component 505. The session controller component 505 maintains a connection table 512 for associating client connections with the appropriate current terminal connection. When the session controller component 503 receives the session information from the session information input component 505, it checks if the client connection ID is in the connection table 512, and if it is it updates the terminal connection ID in the connection table 512. If the client connection ID is not present in the connection table 512, a new entry is added with the client connection ID and associated terminal connection ID. If session state information is received in the session information, the session controller 505 passes the session state information to the message transport component 510, which brings the state of the new terminal connection to the last state of the session, prior to the terminal connection being lost. This may require, for example, sending the last screen sent through the secure client, associated with the client connection ID of the session, to the terminal.

The message transport component 510 acts as a bridge between the persistent secure client connection of the secure client 305 and the secure terminal connection of the secure terminal server 315. The message transport component 510 receives a message to be sent to the terminal. The message transport component 510 identifies the client connection ID associated with the secure client 305 that the message is received from. The message transport component 510 looks up the client connection ID in the connection table 512. When the client connection ID is located in the connection table 512, the associated terminal connection ID is retrieved and the message transport component 510 passes the received message onto the secure terminal server 315, along with the terminal connection ID to be sent to the terminal over the identified secure connection to the terminal. The message transport component 510 may also pass the message to the session state output component 515, which may determine the state information required to be stored based on the message. The state information may be received by the state input component 410 of the session manager 312, from the session state output component 515, which stores the state in the session state table 425 in the appropriate entry.

When the message transport component 510 receives a message from the secure terminal server 315, with a terminal connection ID, the message transport component 510, uses the terminal connection ID to retrieve the associated client connection ID from the connection table 512. The message transport component 510 passes the received message onto the secure client 305 associated with the client connection ID. The message transport component 510 may also pass the received message to the session state output component 515, which may determine the state information required to be stored based on the message. The state information may be received by the state input component 410 of the session manager 312 from the session state output component 515 which stores the state in the session state table 425 in the appropriate entry.

The determination of the state information from a message may alternatively be done by the state input component 410 or the session state manager 425 of the session manager 312, or in an additional component.

The state information may vary depending on the application that the terminal communicates with. If the host application communicates with the terminal using screens, then the terminal does not require any state information, and all that is required is the last screen sent to the terminal from the host application. If the terminal requires application information, for example the terminal may require the previous message sent to the application in order to function properly, the session state information stored in the session state table 430 should include the required information for returning the terminal to the last state prior to losing communication with the secure terminal server 315.

Figure 6:
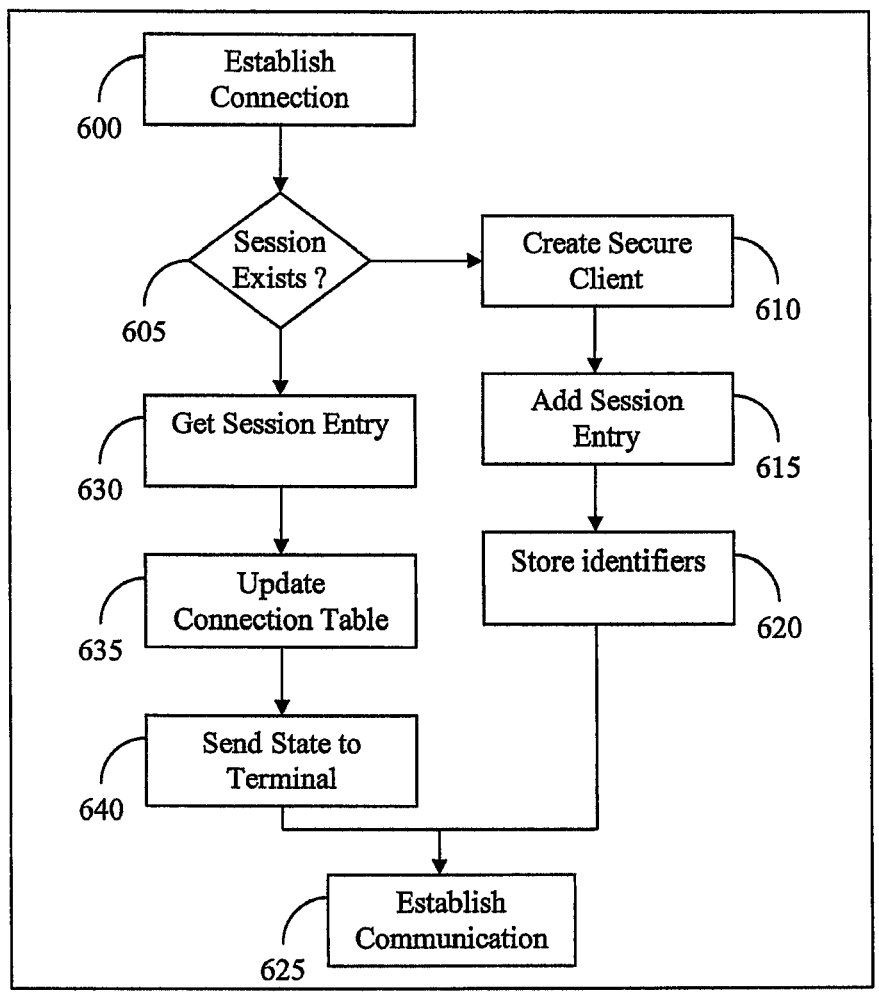
FIG. 6 depicts in a flow chart, illustrative steps of an exemplary method for maintaining persistent secure connections between a terminal and a host.

FIG. 6 depicts in a flow chart illustrative steps of a method for maintaining persistent secure connections between a terminal and a host. The method begins when a new connection request is received from a terminal. The secure terminal connection identifies the terminal, with a terminal ID, that made the connection request. A secure terminal connection is established at step 600, for example over a SSH connection, and the secure terminal connection is given a unique terminal connection ID. At step 605, the terminal ID is used to determine if there is an existing active session associated with the terminal. If no active session exists processing continues to step 610. At step 610 a new secure client 305 is created with an associated client connection ID. The secure client 305 establishes a persistent secure client connection to the host application. At step 615 a new entry is created in a session state table 430 for storing the session information. The entry associates the client connection ID, the terminal connection ID, the terminal ID, and a generated unique session ID. A session requires a persistent secure connection, established by a secure client 305 which has an associated client connection ID. As a result, the client connection ID may be used as the unique session ID. At step 620 the client connection ID and the terminal connection ID are stored in a connection table 515 to associate the client connection with the new terminal connection. At step 625 communication is established between the client connection and the terminal connection.

If at step 605 it is determined that an existing session is associated with the terminal ID, processing continues to step 630. At step 630 the session entry is retrieved using the terminal ID. The client connection ID, terminal connection ID and the session state information are retrieved from the entry. At step 635 the connection table 512 entry is updated to associate the new terminal connection ID with the client connection ID of the session. At step 640, the session state is sent to the terminal using the secure terminal connection associated with the terminal connection ID. Once the terminal is sent the session state information, processing continues to step 625, which establishes communication between the client connection and the terminal connection.

The method for maintaining persistent secure connections between a terminal and a host allows for a secure connection to be created and maintained between a terminal and an application on a host. The method allows a terminal to connect and disconnect from the host application without losing the state of the session. When a terminal reconnects, the method automatically sets the session state to the previous state of the session prior to the terminal being disconnected. This may be advantageous where the terminal is a wireless terminal and the wireless connection is intermittent. Furthermore it may be used when the terminal is temporarily powered off, such as during a break, when requiring power to be saved, when replacing a terminal power supply, etc. It is understood that the advantages of the method are not limited to these situations.

Figure 7:
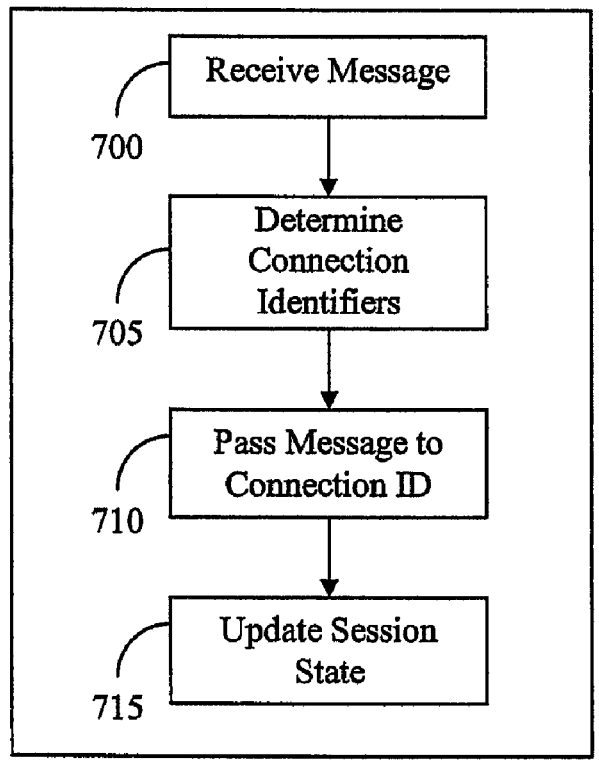
FIG. 7 shows in a flow chart, illustrative steps of a method for establishing communication between a client connection and a terminal connection, in accordance with an exemplary method for maintaining persistent secure connections between a terminal and a host.

FIG. 7 depicts in a flow chart illustrative steps of an exemplary method for establishing communication between a client connection and a terminal connection, in accordance with the exemplary method for maintaining persistent secure connections between a terminal and a host. The method begins at step 700 when a message is received. The message may be received from a secure client 305 or from the secure terminal server 315. Both the secure client 305 and the secure terminal server 315 decrypt messages (received from the host and the terminal respectively). At step 705 the appropriate connection ID is determined from the connection table 512. If the message is received from a secure client 305, it comprises a client connection ID which is used to determine the associated terminal connection ID from the connection table. If the message is received from the secure terminal server 315, it comprises a terminal connection ID which is used to determine the associated client connection ID from the connection table 512. At step 710, the message is passed onto the appropriate connection identified by the associated connection ID. If the message is received from a secure client 305, the message, and associated terminal connection ID, is passed to the secure terminal server 315 to be sent to the terminal over the secure terminal connection identified by the terminal connection ID. If the message is received from the secure terminal server 315, the message and associated client connection ID is passed to the secure client 305 to be sent to the host application over the persistent secure client connection. At step 715, the message is used to update the session state of the session.

Figure 8:
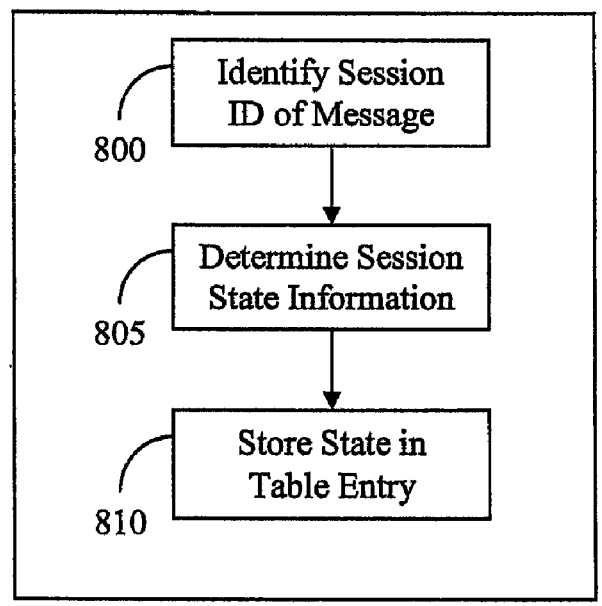
FIG. 8 depicts in a flow chart, illustrative steps of an exemplary method for updating a session state, in accordance with an exemplary method for maintaining persistent secure connections between a terminal and a host.

FIG. 8 depicts in a flow chart illustrative steps of an exemplary method for updating a session state. The method begins at step 800 by identifying the session ID of a received message. At step 805, the state information is determined from the received message, and at step 810 the state information is stored in the appropriate session state table 430 entry.

The step 805 may be dependent upon the host application the terminal communicates with. It may only be necessary to store the last screen or message sent to the terminal. If additional information is required by the terminal to re-establish a specific session state, then step 805 is modified accordingly to store the required information in the session state table 430 entry. The state information may then be sent to a terminal upon reconnecting. The terminal may then use the state information to re-establish the previous session state. This may require displaying the previous screen, sent as the session state information. The session state information may comprise state information of the terminal in addition to a screen to be displayed, in which case the terminal identifies the required state information and updates the information on the terminal accordingly.

Figure 9:
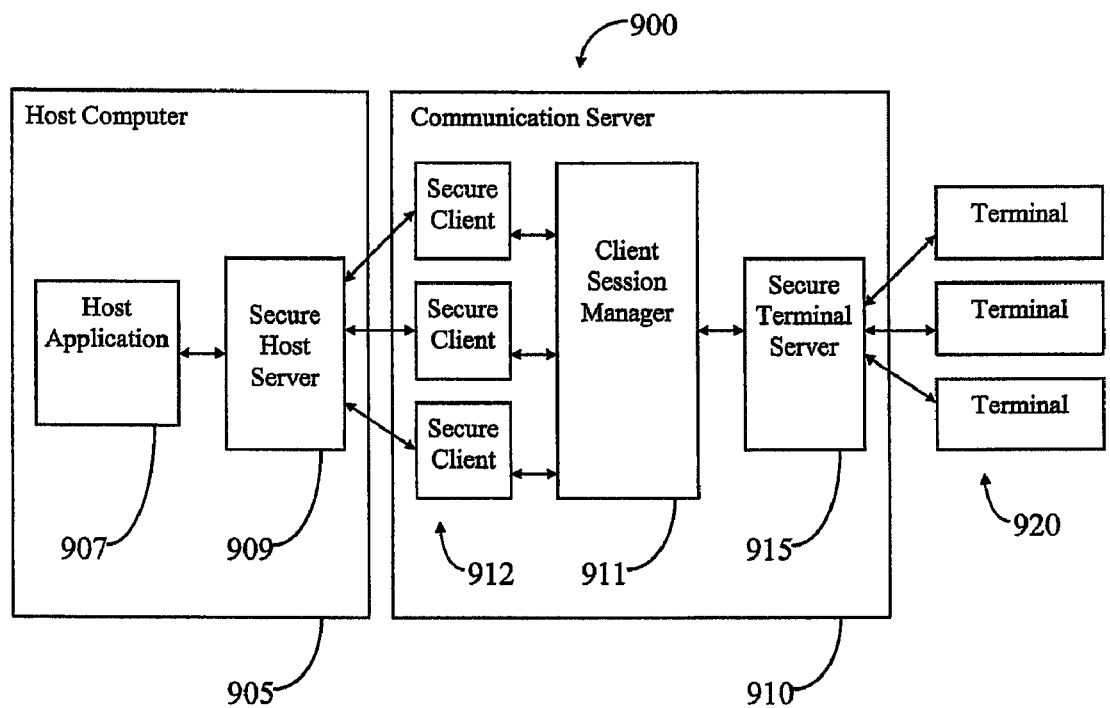
FIG. 9 depicts in a block diagram, illustrative components of an exemplary environment for using an embodiment of a system for maintaining persistent secure connections between a terminal and a host.

FIG. 9 depicts in a block diagram, illustrative components of an environment for using an embodiment of a client session manager 911 in accordance with the present disclosure. The environment 900 comprises a host computer 905. The host computer comprises a host application 907 and a secure host server 909. The host application 907 is adapted to communicate with multiple terminals using messages. The secure host server 909 is adapted to establish secure connections to a secure client 912 for each terminal 920. The host application 907 passes the messages to the secure host server 909, with a client connection ID (for identifying the terminal 920 the message is intended for). The secure host server 909 encrypts the message and sends the encrypted message to a secure client 912.

The environment 900 further comprises a communication server 910. Although the communication server 910 is depicted as separate from the host computer 905, it is understood that the communication server 910 may be implemented on the same hardware as the host computer 905. The communication server 910 comprises secure clients 912. The communication server 910 generates a secure client 912 for each session. The secure client 912 and the secure host server 909 establish a persistent secure communication channel between the host computer 905 and the communication server 910. The secure client 912 and the secure host server 909 may comprise functionality for establishing the persistent secure communication channel using, for example the SSH protocol, which is well known in the art. The secure clients 912 maintain the persistent secure connection, even if the associated terminal 920 is not connected to the communication server 910. The persistent secure communication channel to the secure clients 912 may be closed on an instruction from the communication server 910. The communication server 910 may issue the close instruction, for example, if a terminal 920 specifically requests that the session be closed, or if the session remains inactive for a long period of time, for example 8 hours. Additionally, or alternatively, the Host computer 905 may request to close a persistent secure connection to the secure clients 912 and close the session associated with it. The Client Session Manager 311 then performs the necessary table cleanups. The terminal 920 that was associated with the closed session will have to establish a new connection to the Host Computer 905 through the Communication Server 910 when needed. When a session is closed, the session state table is updated accordingly. This may require, for example, modifying the active flag of the appropriate entry to indicate that the session is no longer active. Alternatively, The entire entry may be removed from the table, or simply the terminal ID of the session.

The communication server 910 comprises a client session manager 911 for establishing sessions for terminal connections. As set forth above the client session manager 911 maintains session state information for each session. The secure clients 912 communicate decrypted messages to the client session manager 911, along with a client connection ID. The client session manager 911 passes the messages to a secure terminal server 915, along with a terminal connection ID (associated with the client connection ID). The secure terminal server 915 encrypts the message and sends it to the terminal 920 over the secure channel established between the terminal 920 and secure terminal server 915 identified by the terminal connection ID.

The secure terminal server 915 communicates with a plurality of wireless terminals 920. The wireless terminal 920 comprise secure terminal clients for establishing the secure terminal communication channel, and encrypting/decrypting messages sent between the terminal 920 and communication server 910.

It is desirable to have the host computer 905 able to authenticate the terminal 920, and the terminal 920 to authenticate the host computer 905. A secure client 912 may be created by client the session manager 911 (on behalf of the terminal 920) using the same terminal ID received by the secure terminal server 915 when the terminal establishes the secure communication with the secure terminal server 915. As a result the host computer 905 receives the same information as it would if it were communicating directly with the terminal 920, and therefore can authenticate the terminal 920. In a similar manner, it may be desirable for the terminal to authenticate the host computer 905. The secure terminal server 915 communicates with the terminal 920 to allow the terminal to authenticate the secure terminal server 915 as if it was the secure host server 909.

Figure 10:
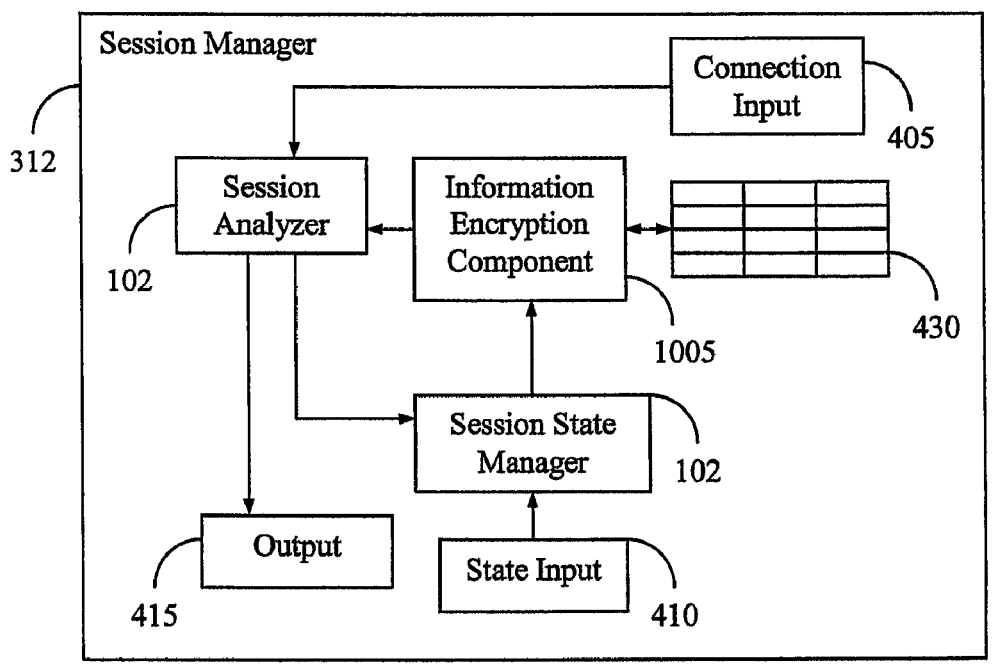
FIG. 10 depicts in a block diagram, illustrative components of an exemplary session manager of an embodiment of a system for establishing persistent secure communication between a terminal and host.

FIG. 10 depicts in a block diagram, illustrative components of a further embodiment of a session manager 312 (see FIG. 3) in accordance with the system for maintaining persistent secure connections between a host and a terminal. The session manager 312 depicted in FIG. 10 comprises all of the components as described for the session manager above; however it also has an information encryption component 1005. The information encryption component 1005 provides additional security by encrypting the information stored in the session state table. If the information stored in the session state table is sensitive it may be desirable to store it in an encrypted format. For example, the session state information may comprise sensitive information. The information encryption component 1005 encrypts and decrypts the information in the session state table 430. The session state manager 1025, is substantially the same as the session state manager 425, however it is modified to send session state information to the information encryption component 1005 instead of directly to the session state table 430. Similarly, the session analyzer 1020 is substantially the same as the session analyzer 420, however it receives the session state information from the information encryption component 1005 instead of directly from the session state table 430. As a result, if the session state table 430 is accessed without authorization, for example if the computer or hard drive the session state table is stored on is stolen, the sensitive information is not compromised.

The information encryption component 1005 may require an encryption key in order to encrypt or decrypt the information. The encryption key may be provided through an universal serial bus (USB) token or other tokens as is known in the art Alternatively the encryption key used to encrypt the information stored in the session state table may itself be stored in an encrypted format. This may have the benefit of changing the encryption key (used to encrypt the session state table) frequently with out having to re-encrypt the session state table. The key-encryption key may be changed daily. For example the host computer may send a new key-encryption key to the communication server over a secure connection. The information encryption component may then encrypt the encryption key for the session state table using the new daily key.

Figure 11:
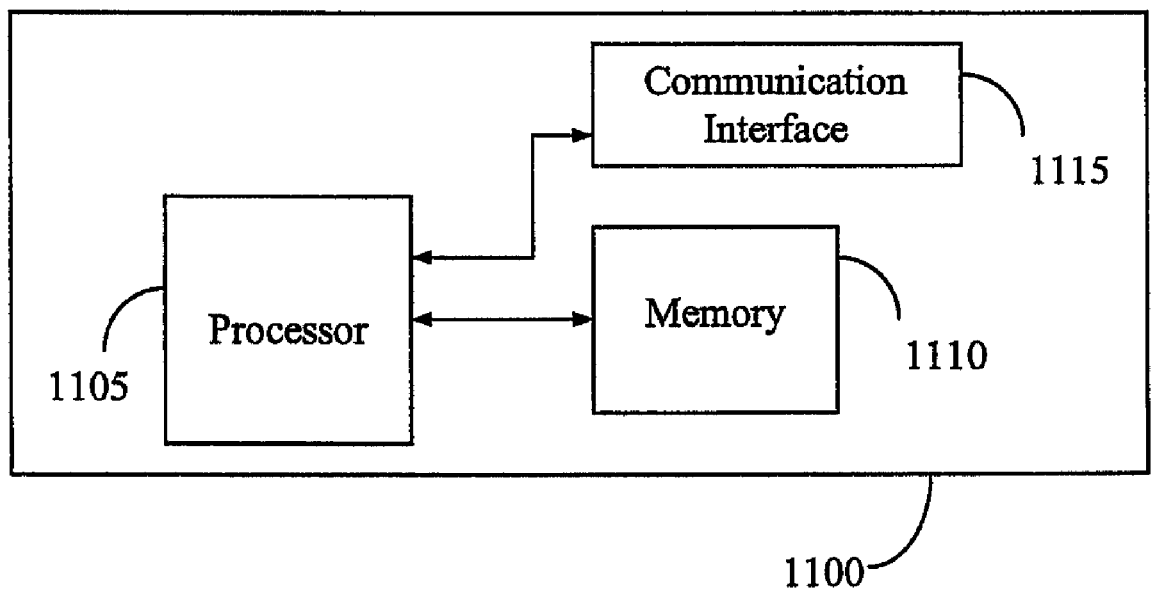
FIG. 11 depicts in a block diagram, illustrative components of hardware that may be used to implement an exemplary embodiment of a system for establishing persistent secure communication between a terminal and host.

The information encryption component 1005 provides additional security by ensuring that the information stored in the session state table can only be accessed if the correct encryption key is known FIG. 11 depicts in a block diagram, illustrative components of hardware 1100 that may be used to implement an exemplary embodiment of a system for establishing persistent secure communication between a terminal and host. The hardware 1100 comprises a processor 1105 for executing instructions, a communication interface 1115 in communication with the processor for providing communication between the host computer and the terminal devices. The hardware 1100 further comprises a memory 1110 for storing the instructions executed by the processor 1105. The memory 1110 further stores information required for the execution of the instructions. When executed by the processor 1105, the instructions provide the components and functionality of the system and method of maintaining a persistent secure connection between a host and a terminal, set forth above.

The systems and methods according to the present invention may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

While particular embodiments of the present invention have been shown and described, changes and modifications may be made to such embodiments without departing from the true scope of the invention.

What is claimed is:

1. A system for maintaining a persistent secure connection between a host and a terminal, the system comprising:
    a processor for executing instructions; and
    a memory for storing instructions for execution by the processor, the instructions when executed configuring the system to provide:
    a secure terminal server component for establishing a terminal connection with a terminal associated with a terminal identifier (ID), the terminal connection uniquely identified by a terminal connection ID;
    a secure client component for establishing a secure shell (SSH) connection with the host for the terminal when a session with the host is created for the terminal, the SSH connection being active regardless of whether the terminal connection is disconnected, the SSH connection uniquely identified by a host connection ID and being associated with the session; and
    a client session manager for bridging the SSH connection and the terminal connection, the client manager comprising:
    a session manager component for associating the SSH connection and the terminal connection with the session, the session manager comprising:
    a session analyzer being configured for:
    determining if the terminal has the session with the host, when the terminal connection is received;
    if it is determined that the terminal does not have the session, creating the session, the SSH connection being established for the session, and
    if it is determined that the terminal has the session, identifying the SSH connection associating with the session; and
    a connection manager component for establishing communication between the SSH connection identified by the host connection ID associated with the session and the terminal connection identified by the terminal connection ID associated with the session.

2. The system as claimed in claim 1, wherein the session manager component stores session information associated with the session in a session state table entry, the session state table entry comprises the associated terminal ID, host connection ID and terminal connection ID.

3. The system as claimed in claim 2, wherein:
    the session information further comprises a session ID identifying the session, the session analyzer component being for determining if the terminal ID is associated with the session ID.

4. The system as claimed in claim 3, wherein the session analyzer component further determines the host connection ID and the terminal connection ID when the terminal ID is associated with the session ID.

5. The system as claimed in claim 3, wherein the session manager component further comprises a session state manager component, for updating the session information associated with the session ID stored in the session state table entry.

6. The system as claimed in claim 1, wherein the connection manager component comprises a connection table for storing connection entries comprising host connection IDs and associated terminal connection IDs.

7. The system as claimed in claim 6, wherein the connection manager further comprises a message transport component for passing messages between the SSH connection identified by the host connection ID, and the terminal connection identified by the terminal connection ID associated with the host connection ID in the connection table.

8. The system as claimed in claim 1, wherein:
    the SSH connection is maintained by periodically sending a keep-alive packet to the host over the SSH connection.

9. A method of maintaining a persistent secure connection between a host and a terminal, the method comprising the steps of:
    establishing, at a secure terminal server component, a terminal connection with a terminal associated with a terminal identifier (ID), the terminal connection uniquely identified by a terminal connection ID;
    establishing, at a secure client component, a secure shell (SSH) connection with the host for the terminal when a session with the host is created for the terminal, the SSH connection being active regardless of whether the terminal connection is disconnected, the SSH connection uniquely identified by a host connection ID and being associated with the session; and
    bridging, at a client session manager, the SSH connection and the terminal connection, the bridging further comprising:
    associating, at a session manager component, the session manager component being a subcomponent of the client session manager, the SSH connection and the terminal connection with the session, said associating by session manager further comprising:
    determining, at a session analyzer, the session analyzer being a subcomponent of the session manager, if the terminal has the session with the host, when the terminal connection is received;
    if it is determined that the terminal does not have the session, creating the session, the SSH connection being established for the session;
    if it is determined that the terminal has the session, identifying the SSH connection associating with the session; and
    establishing, by a connection manager component, the connection manager component being a subcomponent of the client session manager, communication between the SSH host connection, identified by the host connection ID associated with the session, and the terminal connection, identified by the terminal connection ID associated with the session.

10. The method as claimed in claim 9, comprising storing session information in a session state table entry, the session state table entry comprising the associated terminal ID, host connection ID and terminal connection ID.

11. The method as claimed in claim 10, wherein storing session information in a session state table entry further comprises storing a session ID identifying the session; and
further comprising the step of determining if the terminal ID is associated with the session ID.

12. The method as claimed in claim 11, further comprising the step of determining the host connection ID and the terminal connection ID if the terminal ID is associated with the session ID.

13. The method as claimed in claim 11, further comprising the step of updating the session information associated with the session ID stored in the session state table entry.

14. The method as claimed in claim 9, further comprising the step of storing connection entries comprising host connection IDs and associated terminal connection IDs in a connection table.

15. The method as claimed in claim 14, further comprising the step of passing messages between the SSH connection identified by the host connection ID, and the terminal connection identified by the terminal connection ID associated with the host connection ID in the connection table.

16. The method as claimed in claim 9, further comprising the step of maintaining the SSH connection comprising the step of periodically sending a keep-alive packet to the host over the SSH connection.

17. A computer program product for maintaining a persistent secure connection between a host and a terminal, the computer program product comprising a non-transitory computer readable medium embodying program code means for implementing a method comprising the steps of:
establishing, at a secure terminal server component, a terminal connection with a terminal associated with a terminal identifier (ID), the terminal connection uniquely identified by a terminal connection ID;
establishing, at a secure client component, a secure shell (SSH) connection with the host for the terminal when a session with the host is created for the terminal, the SSH connection being active regardless of whether the terminal connection is disconnected, the SSH connection uniquely identified by a host connection ID and being associated with the session; and
bridging, at a client session manager, the SSH connection and the terminal connection, the bridging further comprising:
associating, at a session manager component, the session manager component being a subcomponent of the client session manager, the SSH connection and the terminal connection with the session, said associating by session manager further comprising:
determining, at a session analyzer, the session analyzer being a subcomponent of the session manager, if the terminal has the session with the hosts when the terminal connection is received;
if it is determined that the terminal does not have the session, creating the session, the SSH connection being established for the session;
if it is determined that the terminal has the session, identifying the SSH connection associating with the session; and
establishing, by a connection manager component, the connection manager component being a subcomponent of the client session manager, communication between the SSH connection, identified by the host connection ID associated with the session, and the terminal connection, identified by the terminal connection ID associated with the session.

18. The system as claimed in claim 1, wherein the client manager is for bringing the state of the terminal connection to a last state of the session at the time of disconnecting the terminal from the secure terminal server.

19. The method as claimed in claim 9, wherein the step of establishing communication comprises bringing the state of the terminal connection to a last state of the session at the time of disconnecting the terminal connection.

20. The computer program product as claimed in claim 17, wherein the step of establishing communication comprises bringing the state of the terminal connection to a last state of the session at the time of disconnecting the terminal connection.

* * * * *

UNITED STATES PATENT AND TRADEMARK OFFICE
CERTIFICATE OF CORRECTION

| | | |
|---|---|---|
| PATENT NO. | : 8,271,777 B2 | Page 1 of 1 |
| APPLICATION NO. | : 12/205242 | |
| DATED | : September 18, 2012 | |
| INVENTOR(S) | : Borisov | |

It is certified that error appears in the above-identified patent and that said Letters Patent is hereby corrected as shown below:

In Column 9, Line 39, delete "311" and insert -- 911 --, therefor.

In Column 9, Line 46, delete "Alternatively, The" and insert -- Alternatively, the --, therefor.

In Column 10, Line 47, delete "art Alternatively" and insert -- art. Alternatively, --, therefor.

In Column 10, Line 51, delete "with out" and insert -- without --, therefor.

In Column 10, Line 61, delete "known" and insert -- known. --, therefor.

In Column 14, Line 14, in Claim 17, delete "hosts" and insert -- host --, therefor.

Signed and Sealed this
Nineteenth Day of March, 2013

Teresa Stanek Rea
*Acting Director of the United States Patent and Trademark Office*